United States Patent
Huber et al.

(10) Patent No.: US 9,446,664 B2
(45) Date of Patent: *Sep. 20, 2016

(54) PTO TRANSMISSION SYSTEM IN A WORK VEHICLE

(75) Inventors: Christian Huber, Wolfern (AT); Riccardo Morselli, San Vito di Spilamberto (IT); John Posselius, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 118 days.

This patent is subject to a terminal disclaimer.

(21) Appl. No.: 13/984,322

(22) PCT Filed: Feb. 16, 2012

(86) PCT No.: PCT/EP2012/052721
§ 371 (c)(1),
(2), (4) Date: Oct. 14, 2013

(87) PCT Pub. No.: WO2012/110616
PCT Pub. Date: Aug. 23, 2012

(65) Prior Publication Data
US 2014/0033838 A1    Feb. 6, 2014

(30) Foreign Application Priority Data
Feb. 17, 2011   (IT) ............... TO2011A0136

(51) Int. Cl.
| | | |
|---|---|---|
| B60K 25/06 | (2006.01) | |
| B60W 30/188 | (2012.01) | |
| B60K 17/28 | (2006.01) | |
| B60W 10/30 | (2006.01) | |
| F16H 61/47 | (2010.01) | |
| B60W 10/06 | (2006.01) | |
| B60W 10/103 | (2012.01) | |
| F16H 59/66 | (2006.01) | |
| F16H 47/04 | (2006.01) | |
| F16H 37/08 | (2006.01) | |

(52) U.S. Cl.
CPC ............... *B60K 25/06* (2013.01); *B60K 17/28* (2013.01); *B60W 10/06* (2013.01); *B60W 10/103* (2013.01); *B60W 10/30* (2013.01); *B60W 30/1888* (2013.01); *F16H 61/47* (2013.01); *B60W 2510/105* (2013.01); *B60W 2520/28* (2013.01); *B60W 2550/402* (2013.01); *B60Y 2200/22* (2013.01); *F16H 47/04* (2013.01); *F16H 2037/088* (2013.01); *F16H 2037/0866* (2013.01); *F16H 2059/666* (2013.01); *Y02T 10/76* (2013.01)

(58) Field of Classification Search
None
See application file for complete search history.

(56) References Cited

U.S. PATENT DOCUMENTS

| | | | |
|---|---|---|---|
| 2003/0162619 A1* | 8/2003 | Rodeghiero et al. | 475/73 |
| 2006/0148607 A1* | 7/2006 | Rodeghiero et al. | 475/83 |
| 2012/0310491 A1* | 12/2012 | Vermeulen | 701/50 |
| 2014/0026691 A1* | 1/2014 | Huber et al. | 74/15.86 |

* cited by examiner

Primary Examiner — Colby M Hansen
(74) Attorney, Agent, or Firm — Rebecca L. Henkel

(57) ABSTRACT

A PTO transmission system in a vehicle for transmitting power to a PTO shaft driving an implement comprises a planetary drive unit having first and second input and output coupled to the PTO shaft. The first and second inputs are coupled to an output shaft of the vehicle engine and to an output shaft of a drive motor, respectively. A control system controls the transfer of power from a power source to the drive motor. The power source is a variable power generating source driven by the PTO shaft. The drive motor is configured and adapted to decrease or increase the rotational speed of the output of the planetary drive unit on an increase or decrease of the power transferred to it, respectively.

6 Claims, 7 Drawing Sheets

PTO TRANSMISSION SYSTEM IN A WORK VEHICLE

CROSS REFERENCE TO RELATED APPLICATIONS

This application is the US National Stage filing of International Application Serial No. PCT/EP2012/052721, entitled "PTO TRANSMISSION SYSTEM IN A WORK VEHICLE," filed Feb. 16, 2012, which claims priority to Italian Application Serial No. TO2011A000136, filed Feb. 17, 2011, each of which is incorporated by reference herein in its entirety for all purposes.

FIELD OF THE INVENTION

The present invention relates to a PTO transmission system in a work vehicle for transmitting power to a PTO shaft driving an implement.

BACKGROUND OF THE INVENTION

The present invention relates to a PTO transmission system in an agricultural or industrial vehicle, that is, a work vehicle, for transmitting power to a PTO shaft driving an implement, said vehicle comprising an engine and ground drive wheels driven by main or traction drive transmission means comprising a continuously variable transmission (CVT) or a power shift transmission, wherein the PTO transmission system comprises a planetary drive unit having first and second input means and output means, said first input means being adapted to be coupled to an output shaft of said engine, said second input means being adapted to be coupled to an output shaft of drive motor means and said output means being adapted to be coupled to said PTO shaft, said output means having a rotational speed which is a function of a rotational speed of the first and second input means; power source means; and control means adapted to control the transfer of power from said power source means to said drive motor means and coupled to sensor means adapted to sense the vehicle wheel speed and the PTO shaft speed.

Present day agricultural or industrial vehicles and specifically tractors comprise electronic engine controls and continuously variable transmissions (CVT) or power shift transmissions in an effort to provide optimum performance and fuel efficiency.

On the other hand, most PTO driven implements require a constant drive shaft speed or a drive shaft speed governed by other considerations to insure proper operation.

Therefore, PTO transmission systems for agricultural or industrial vehicles for transmitting power to a PTO shaft driving an implement or variable transmissions between the PTO shaft and drive means on the implement itself have been designed in an effort to allow the control the working speed of such implements independent from the wheel speed of the vehicle or the speed of rotation of the engine thereof.

Examples for such PTO transmission systems may be found in U.S. Pat. No. 6,692,395-B2 or the DE-A1-196 21 391. These PTO transmission systems use planetary gear units having two input shafts driven by the engine and an auxiliary drive motor, and an output shaft for driving the PTO shaft. By changing the speed of rotation of the auxiliary drive motor, the speed of the PTO shaft may be varied in relation to the engine speed. The energy consumption of such auxiliary drives is relatively high and it still is not possible to readily adapt the PTO transmission system to different implements and working conditions.

The present invention is directed to a PTO transmission system and a method of operating thereof, wherein the power consumption is reduced and which is readily adaptable to different implements and working conditions.

SUMMARY OF THE INVENTION

According to a first aspect of the present invention, a PTO transmission system in an agricultural or industrial vehicle for transmitting power to a PTO shaft driving an implement, said vehicle comprising an engine and ground drive wheels driven by main transmission means comprising a continuously variable transmission (CVT) or a powershift transmission; said PTO transmission system comprising: a planetary drive unit having a first and second input means and output means, said first input means being adapted to be coupled to an output shaft of said engine, said second input means being adapted to be coupled to an output shaft of drive motor means and said output means being adapted to be coupled to said PTO shaft; control means operable to control the engine rpm, the transmission ratio of said transmission means and said drive motor means; and an engine speed sensor, a PTO shaft speed sensor, operable to measure engine speed and PTO shaft speed respectively, and coupled to said control means; a target PTO speed; and characterized in that said control means may be operable to control the engine rpm, the gear ratio of said transmission means and said drive motor means to obtain a PTO output shaft speed corresponding said target PTO speed is provided.

The PTO output shaft speed may be adapted in an optimum manner to the working environment such that the working efficiency is optimized.

The control may preferably be connected to an operator actuable mode selector means for selecting a plurality of working modes.

The selector means provided by an operator actuable mode selector means, said input signals defining a predetermined combination of control parameters for the engine speed, the wheel speed and the PTO speed.

According to the invention one working mode may be selected wherein said target PTO speed is defined by GPS mapping information or ISO-bus connected sources or operator input.

This working mode permits an optimization of the operation of the implement based on GPS data of ISOBUS input devices and an improved fuel efficiency.

A further working mode may be selected wherein said target PTO speed is a function of the wheel speed.

As a result, the rotational speed of the output means of the planetary drive unit and thereby the PTO shaft is readily adaptable to different implements and working conditions, at the same time optimizing the fuel and working efficiency.

Further, said target PTO speed may be proportional to the wheel speed in a first wheel speed zone and said target PTO speed is constant in a second wheel speed zone, above a threshold wheel speed.

Moreover, the invention may further comprise a torque sensor, coupled to the control unit, and an even further working mode may be selected wherein the target PTO speed is based on a constant target PTO load.

According to a second aspect of the present invention a method according to claim 6 is provided.

BRIEF DESCRIPTION OF THE DRAWINGS

Non-limiting preferred embodiments of the invention will be described below with reference to the drawings.

In the drawings.

DETAILED DESCRIPTION OF THE PREFERRED EMBODIMENT(S)

Figure 1:
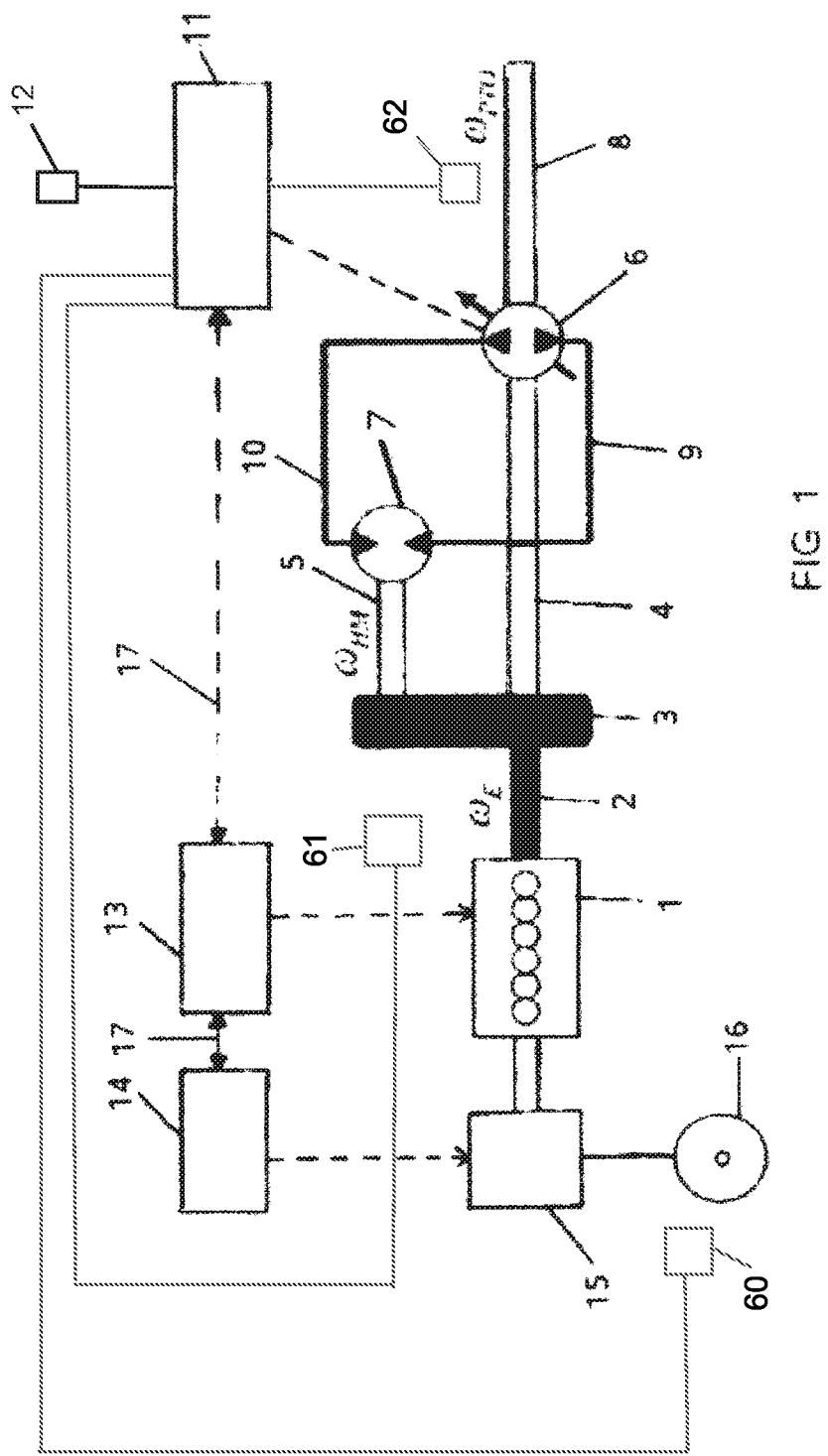
FIG. 1 shows a first embodiment of the PTO transmission system according to the invention.

In FIG. 1, an embodiment of the PTO transmission system in an agricultural or industrial vehicle for transmitting power to a PTO shaft 8 driving an implement is shown.

The vehicle 30 is only schematically shown and comprises an engine 1 and drive wheels 16 (only one being shown) driven by traction drive or main transmission means 15 comprising a continuously variable transmission (CVT) or a power shift transmission.

The PTO transmission system comprises a planetary drive unit 3 having first and second input shafts 2, 5 and an output shaft 4. The input shafts 2, 5 may be for instance coupled to or in engagement with the sun gear and the ring gear, respectively, of the planetary drive unit 3, whereas the planet gear carrier planetary drive unit 3 may be coupled to the output shaft 4.

The first input shaft is an output shaft 2 of the engine 1, whereas the second input shaft is an output shaft 5 of drive motor means 7. The output shaft 4 of planetary drive unit 3 is coupled to a PTO shaft 8.

With this planetary drive unit 3, the output shaft 4 has an rotational speed ωPTO which is a function of a rotational speed ωE and ωHM of the first and second input shafts 2, 5, respectively. The drive motor means 7 therefore is adapted to decrease or increase the rotational speed ωPTO of said output shaft 4 of said a planetary drive unit 3 on an increase or decrease of the power transferred to it, respectively, under control of said control means 11.

A variable power source 6 which may comprise a variable displacement hydraulic pump drivingly connected to the PTO shaft 8 and controlled by control means 11, and said drive motor 7 may comprise a hydraulic motor driven by said pump 6 via hydraulic lines 9 and 10. The variable displacement pump and hydraulic motor work together as a hydrostatic drive.

Alternatively, the variable power source 6 may comprise an electric generator drivingly connected to said PTO shaft 8 and controlled by a control system or control means 11. In this case, the drive motor 7 may comprise an electric motor driven by said generator.

The control means 11 is adapted to control the transfer of power from said power source 6 to said drive motor means 7 and is coupled to sensor means illustrated in FIG. 1 sensing the vehicle wheel speed 60, the engine speed 61, and the PTO shaft speed and the PTO torque, collectively 62.

Further, the control means 11 is connected to an electronic engine control unit 13 and an electronic transmission control unit 14 of said traction drive or main transmission means 15 via any of the conventional bus systems 17 known in this field.

The control means 11 further comprises operator actuable selecting means 12 for selecting any one of a plurality of working modes of said PTO transmission system. This control means is adapted to further control the engine speed, a gear ratio of the main transmission means and the PTO speed in response to input signals provided by the operator actuable mode selector or selector means 12, said input signals defining a predetermined combination of control parameters for the engine speed, the wheel speed and the PTO speed. These input signals may define a predetermined combination of the engine speed and a gear ratio of the main transmission means 15 operative to reduce the power fed to said drive motor means (6,51) to a minimum.

In another working mode, these input signals may define a predetermined combination of the engine speed and a gear ratio of the main transmission means operative maintain the PTO speed at a selected speed.

The operator actuable mode selector means (12) are further operative to generate said input signals defining a predetermined combination of control parameters for the engine speed, the wheel speed and the PTO speed in response to external signals comprising one or more of GPS signals, ISOBUS signals, PTO torque signals and signals generated by the implement 20.

Figure 2A:
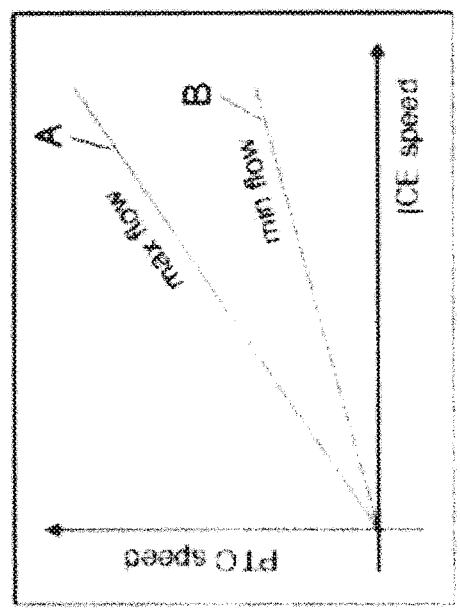
FIG. 2a shows a diagram for explaining a mode of operation of the second embodiment.
Figure 2:
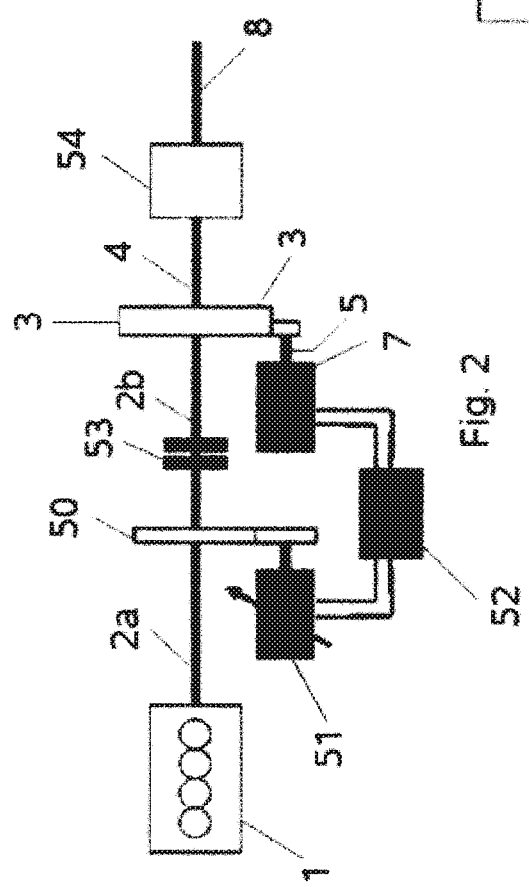
FIG. 2 shows a second embodiment of the PTO transmission system according to the invention.
Figure 3:
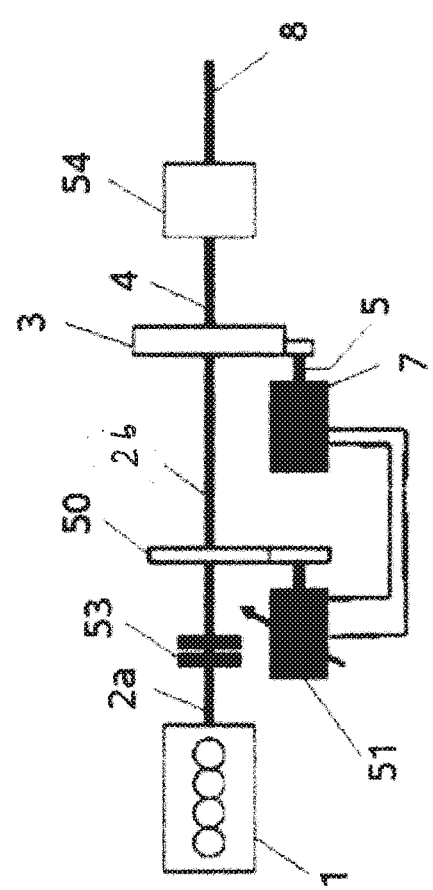
FIG. 3 shows a third embodiment of the PTO transmission system according to the invention.
Figure 4:
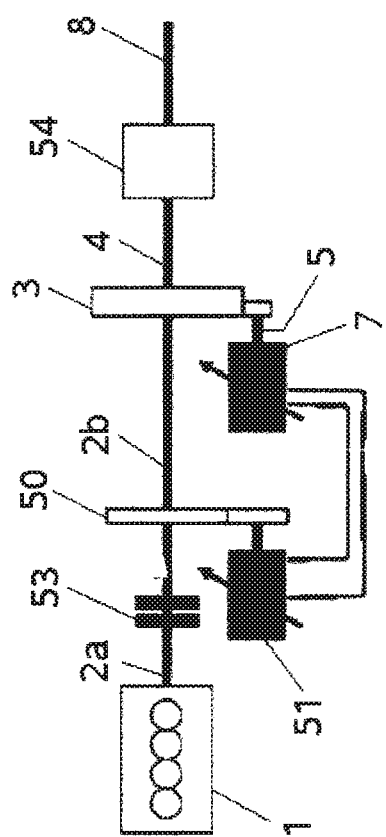
FIG. 4 shows a fourth embodiment of the PTO transmission system according to the invention.

The drawings of the embodiments of FIGS. 2 to 4 only show the hydraulic components of the PTO drive system and use the same control means 11, 12, 13 and 14 as in FIG. 1, so that this control system is not set out in these drawings again.

In FIG. 2, the hydraulic pump comprises a standard load sensing pump 51 which is anyhow provided on the vehicle and is constantly driven by the output shaft 2a engine 1 preferably via a gearbox 50. This pump is controlled by the control means 11 and feed the drive means 7 via a hydraulic compensator 52, again under control of said control means 11.

The first input means of the planetary gear 3 comprises an engine shaft section 2b coupled to the engine output shaft section 2a via a clutch 53 permitting to completely shut off the PTO system if not in use.

The output shaft of the planetary gear is optionally coupled to the PTO shaft 8 via a PTO gearbox 54 to reduce the size and cost of the hydraulic components of the system.

FIG. 2A shows the relationship between the engine (ICE) speed on the horizontal axis and the PTO speed on the vertical axis. The PTO speed may be varied between a minimum flow and a maximum flow of the engine 1, and between these graphs, a reliable operation is possible.

In the embodiment of FIG. 3, the drive means 7 of the second input means 5 of the planetary gear 3 is powered by an additional pump 51 which is a variable displacement pump driven via a clutch 53 at the output of the engine 1 and a gearbox 50 on the second output shaft section 2b of the engine 1 extending to the planetary gear 3. The drive means comprises a standard hydraulic motor 7. The pump 51 is controllable via the control means 11 shown in FIG. 1.

To permit a complete shut-off of the PTO system, the PTO clutch 50 between the sections 2a and 2b of the output shaft of the engine 1 may be disengaged.

A PTO gearbox 54 may be provided at the output end of the PTO shaft as in FIG. 2.

FIG. 4 differs from the embodiment of FIG. 3 in that both pump 51 and motor 7 have a variable displacement and are both controlled by the control means 11.

In the following, examples of working modes of the PTO system of FIGS. 1 to 4 will be described.

Figure 5:
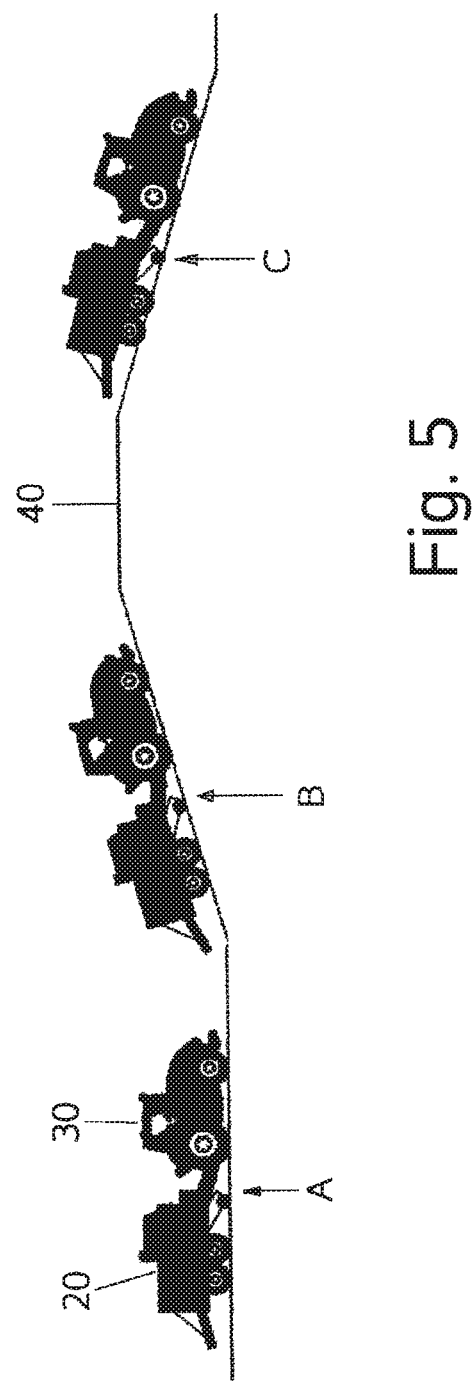
FIG. 5 shows an example of a working mode using a PTO transmission system according to the present invention.

As exemplified in FIG. 5, these working modes may comprise a first working mode wherein the operator selects at said input means 12 a constant PTO speed and a constant wheel speed. The electronic engine control unit 13 automatically controls the engine speed and electronic transmission control unit 14 automatically selects one of the selectable gears thereof for maintaining this constant wheel speed. The PTO speed is constant independently from the engine speed. Therefore, even if the combination of the vehicle 30 and the implement rides uphill or downhill, the PTO speed is constant, and only the engine speed and the selected gear change.

In this example, on even ground at position A, the vehicle speed is 10 km/h, the engine speed is 1900 rpm, and the gear selected is gear 10. At the uphill position B, the engine speed is automatically increased to 2200 rpm, and gear 9 is selected. At the downhill position C, the engine speed is automatically decreased to 1600 rpm, and gear 11 is selected. At all positions, the PTO speed is kept constant at for instance 1000 rpm.

Figure 6:
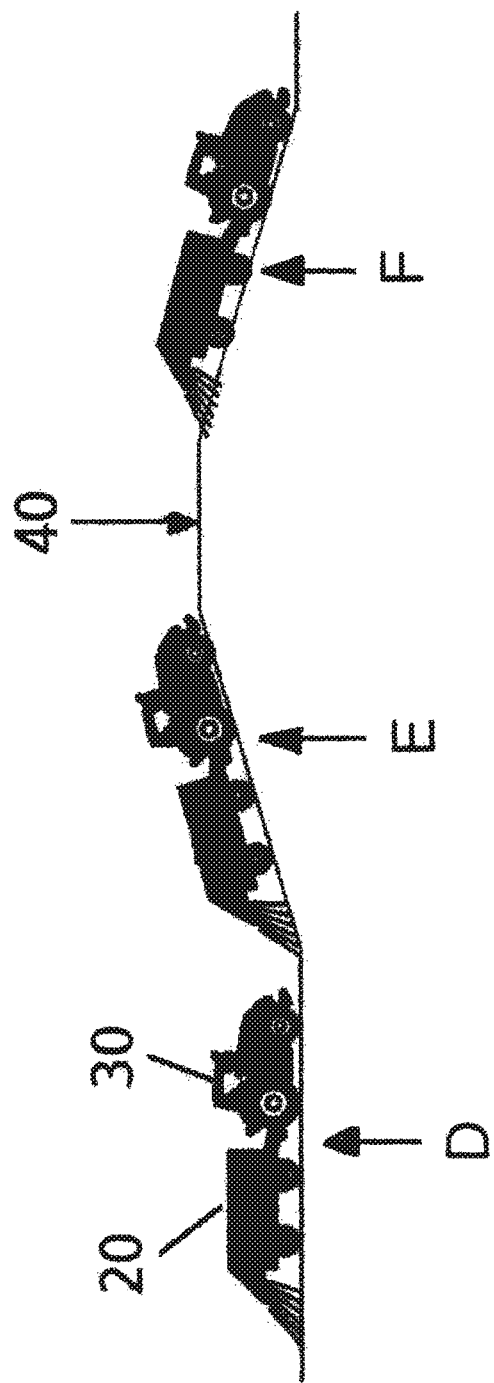
FIG. 6 shows a further example of a working mode using a PTO transmission system according to the present invention.
Figure 7:
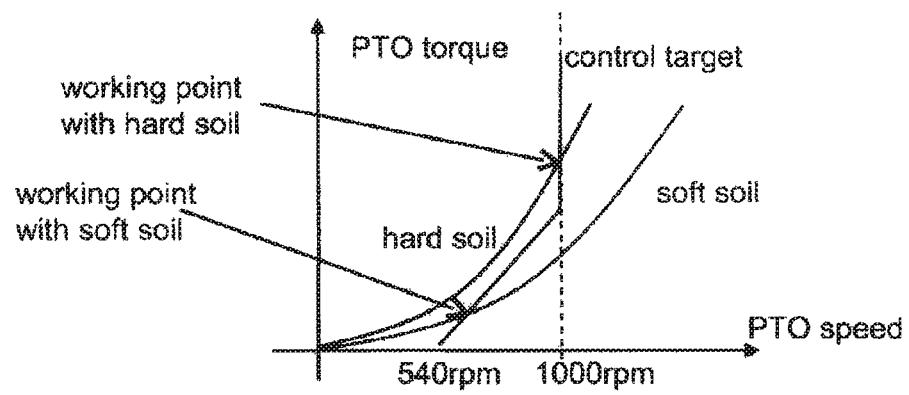
FIG. 7 shows a diagram for explaining possible modes of operation of the transmission system of the present invention.

In FIG. 6, a second working mode is shown, wherein the operator selects at said input means 12 a PTO speed proportional to a predetermined wheel speed selected by the operator or automatically controlled, the electronic engine control unit 13 being adapted to automatically control the engine speed and electronic transmission control unit 14 being adapted to automatically select one of the selectable gears thereof for maintaining said predetermined wheel speed. In this working mode, the engine speed is kept constant at 1900 rpm and the PTO speed is always kept proportional to the wheel speed so that for instance at position D, the PTO speed is 1000 rpm, whereas the wheel speed is 10 km/h. The selected gear is 10. At uphill position E, the wheel speed reduces to 9 km/h, the PTO speed is proportionally reduced to 900 rpm, and gear 9 is automatically selected. At downhill position F, the wheel speed increases again to 10 km/h with a proportional PTO speed of 1000 rpm, and gear 11 is selected. This working mode results in a uniformity of operation of the implement independently from the wheel speed and an improved fuel efficiency.

In the situation of FIG. 6, a third working mode may be selected, wherein said PTO speed is determined as a function of a GPS map or a ISOBUS request, the wheel speed is selected by the operator or automatically controlled, the electronic engine control unit 13 being adapted to automatically control the engine speed and electronic transmission control unit 14 being adapted to automatically select one of the selectable gears thereof for maintaining said constant wheel speed. In this working mode, the PTO speed is a function of a GPS map or a ISOBUS request, and the wheel speed is kept constant at 10 km/h so that for instance at position D, the PTO speed is 900 rpm, whereas the engine speed is 1900 rpm. The selected gear is 10. At uphill position E, the engine speed increases to 2200 rpm whereas the PTO speed is increased to 1000 rpm in view of the operation based on a function of GPS map data or a ISOBUS request, and gear 9 is automatically selected. At downhill position F, the engine speed decreases to 1600 rpm, whereas the PTO speed is still 1000 rpm, and gear 11 is selected. This working mode results in an optimization of operation based on a function of the GPS map data or the ISOBUS request and an improved fuel efficiency.

There may be any kind of functional relation between the vehicle wheel speed and the PTO speed, it should not always be a proportional relation. The operator may for instance define two working points where a certain PTO speed is selected for a specific wheel speed. A line through these working points may define such a relation between the PTO speed and the wheel speed for the entire wheel speed range.

A threshold wheel speed can be defined to allow a different strategy below and above said threshold. Below said threshold the relation between the PTO speed and the wheel speed could be a proportional relation while above said threshold the PTO speed may be fixed, defining a saturation zone.

Referring to FIG. 6 also a fourth working mode may be explained wherein the operator selects at said input means 12 a predetermined PTO speed and a predetermined or automatically controlled wheel speed, the electronic engine control unit 13 being adapted to automatically control the engine speed and said electronic transmission control unit 14 being adapted to automatically select one of the selectable gears thereof for maintaining said predetermined or automatically controlled wheel speed. In this working mode, the wheel speed is kept constant at 10 km/h and the operator selects continuously a desired PTO speed, so that for instance at position D, the PTO speed is selected as 900 rpm, whereas the engine speed automatically controlled to 1900 rpm. The selected gear is 10. At uphill position E, the engine speed increases to 2200 rpm, and the operator has selected a PTO speed of 1000 rpm. Gear 9 is automatically selected. At downhill position F, the engine speed decreases to 1600 rpm and gear 11 is selected. The selected PTO speed is kept to 1000 rpm. This working mode permits an optimization of operation of the implement based on operator's input and may result in improved fuel efficiency.

In a fifth working mode, a PTO speed resulting in a constant PTO power is automatically controlled by said control means 11, the wheel speed is selected by the operator or automatically controlled, the engine speed is selectable by the operator or automatically controlled by said electronic engine control unit 13, and a gear is selectable by the operator or automatically selected by said electronic transmission control unit 14. In this working mode, the PTO output power is kept constant. When the load on the PTO increases, the PTO speed is decreased in order to not exceed an adjustable power limit or to keep a constant output power. The benefit of this working mode is that similar to the draft mode for the rear implement: the output power is maximized. A torque sensor on the PTO shaft 8 measures the load on said shaft 8 and said control means 11 adapts the PTO speed to keep the PTO output power constant.

In a sixth working mode, a soft soil treatment is desired. In this working mode, the PTO speed is automatically controlled by said control means 11 in response to the load acting on said PTO shaft 8, the wheel speed is selected by the operator or automatically controlled, the electronic engine control unit 13 controls the engine speed in response to and operator input or automatically, and a variable gear is selected by the operator or automatically selected by the electronic transmission control unit 14. The PTO speed is automatically reduced when the load is low enough, e.g. below a predefined threshold. As an example for this working mode, a soil cultivator may be considered. If the soil is hard the mechanical work to prepare the soil is higher than when the soil is softer. With a softer soil the full PTO speed is not necessary, so it is reduced. By reducing the PTO speed when not necessary, fuel consumption is reduced, and an optimized treatment is obtained. This is shown in the diagram of FIG. 4 wherein the working conditions in hard and soft soil are indicated. This working mode avoids an increase of the PTO speed beyond a control target in soft soil and even decreases the working point to a lower PTO speed of 540 rpm when operating in soft soil. In hard soil, the control target of 1000 rpm is automatically controlled.

In spite of the fact that specific working modes have been set out above, desired combinations of the specifics of these working modes are envisaged and possible.

In all working modes, a PTO speed, a tractor wheel speed, an engine speed and a variable gear are selected and/or automatically controlled according to a selected working mode within safe margins to avoid an engine stall on a sudden increase of the load on the PTO shaft. When the engine speed is lower than the rated speed (i.e. 1900 rpm), the engine may have power enough but the torque margin is reduced. In case of a sudden PTO load increase, if the PTO speed is kept constant, the engine would stall, therefore the PTO speed is temporarily reduced to virtually increase the torque margin. This has the benefit that the operator can work very close to the maximum engine power and efficiency (i.e. 1900 rpm) without the risk to stall the engine in case of sudden load variations. Higher efficiency (better engine working point) and higher productivity (works closer to max engine speed) are achieved.

The invention claimed is:

1. A power-takeoff PTO transmission system in a work vehicle for transmitting power to a PTO shaft driving an implement, the vehicle comprising an engine and ground drive wheels driven by a main transmission comprising a continuously variable transmission (CVT) or a powershift transmission;

the PTO transmission system comprising:
a planetary drive unit having a first and second input and output, the first input being coupled to an output shaft of the engine, the second input being coupled to an output shaft of a drive motor and the output being coupled to the PTO shaft;
a control system which operates to control an engine rpm, a transmission ratio of the transmission and the drive motor;
an engine speed sensor and a PTO shaft speed sensor, which operates to measure engine speed, and PTO shaft speed respectively, and coupled to the control system;
wherein the control system operates to control the engine rpm, a gear ratio of the transmission, and the drive motor to obtain a PTO output shaft speed which meets a target PTO speed, and wherein the PTO transmission system further comprises a wheel speed sensor which operates to measure wheel speed and coupled to at least a portion of the control system, wherein the control system comprises a working mode wherein the target PTO speed is a function of the wheel speed
when the target PTO speed is set based on a target wheel speed set between a lower first wheel speed and a higher second wheel speed, and the target PTO speed is constant so long as the target wheel speed is above the second higher wheel speed.

2. The PTO transmission system according to claim 1, further comprising a PTO torque sensor.

3. The PTO transmission system according to claim 1, wherein the control system operates to automatically reduce the target PTO speed on a sudden increase of the load on the engine to avoid stall, when the engine rpm is below a threshold value.

4. The PTO transmission system according to claim 3, wherein the control system operates to control the engine rpm and the transmission ratio to resulting in at least one of (a) minimizing input from the drive motor and (b) minimizing engine fuel consumption.

5. The PTO transmission system according to claim 4, wherein the control system further comprises an actuable selector coupled to the control system which operates to select the working mode.

6. The PTO transmission system according to claim 1, wherein the drive motor is a hydraulic motor and a variable power source is a variable hydraulic pump working together as a hydrostatic unit, the hydraulic pump being driven by the PTO output shaft or the engine output shaft.

* * * * *